W. S. Cooper,
Faucet.
No. 103,145.
Patented May 17, 1870.
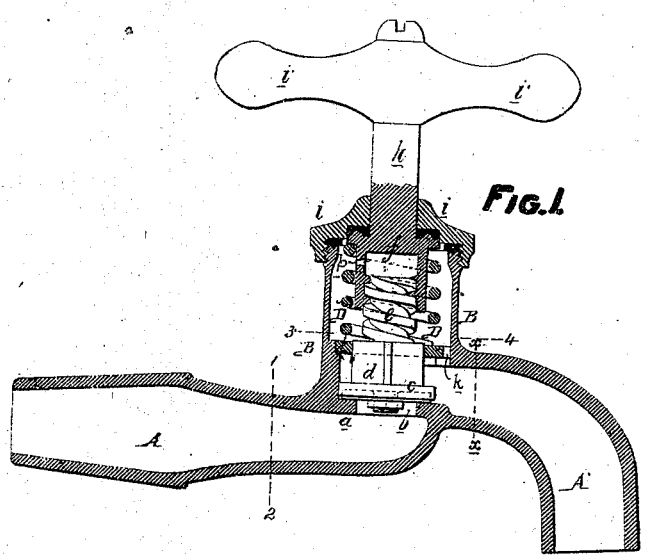
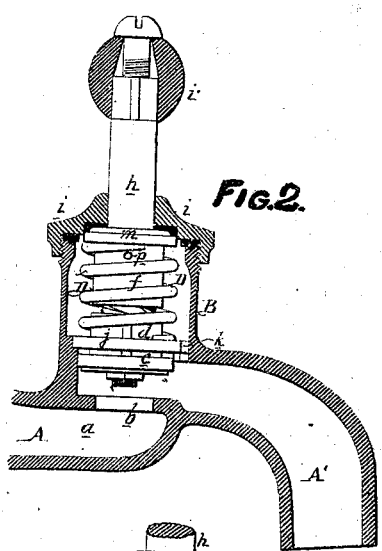
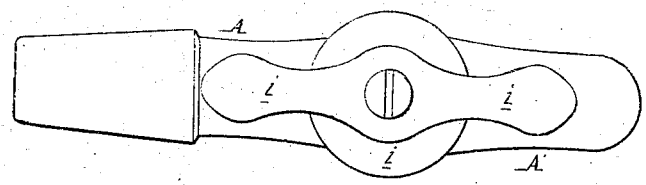
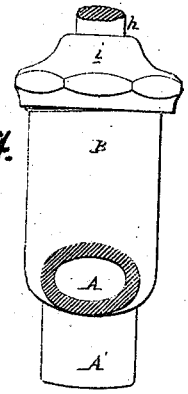
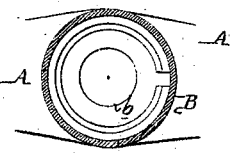
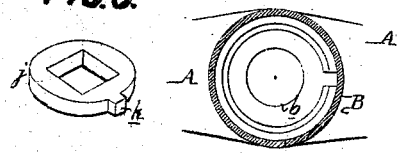
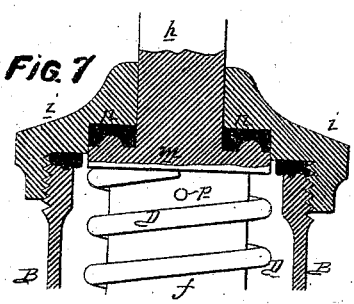
WITNESSES
Wm. A. Steel.
John Parker.
W. S. Cooper
by his Atty
Howson and Son

United States Patent Office.

WILLIAM S. COOPER, OF PHILADELPHIA, PENNSYLVANIA.

Letters Patent No. 103,145, dated May 17, 1870.

IMPROVEMENT IN FAUCETS.

The Schedule referred to in these Letters Patent and making part of the same.

I, WILLIAM S. COOPER, of Philadelphia, county of Philadelphia and State of Pennsylvania, have invented an Improved Faucet and Stop-Valve, of which the following is a specification.

Nature and Object of the Invention.

My invention relates to improvements in faucets having vertical valve-casings, from which project inlet and outlet branches; and consists—

First, of a stationary guiding-plate, adapted to the interior of the valve-casing, as hereafter described, and having a square opening for the passage of the square portion of the valve, which is thus prevented from turning.

Second, of a spiral spring, arranged within the casing in the manner described hereafter, so as to serve the twofold purpose of maintaining the plate for guiding the valve in its proper position, and maintaining the nut which operates the valve in tight contact with its packing.

Third, of a mode, described hereafter, of preventing the fluid in the valve-casing from gaining access to and injuring the leather packing against which the nut for operating the valve has to bear.

Fourth, of a mode, described hereafter, of insuring a thorough and continuous lubrication of the nut and screw for operating the valve by the water or other fluid which gains access to the interior of the valve-casing.

Description of the Accompanying Drawing.

Figure 1 is a vertical section of my improved faucet;
Figure 2, the same, with the valve in a different position;
Figure 3, a plan view;
Figure 4, a transverse section on the line 1–2, fig. 1;
Figure 5, a sectional plan of part of the faucet on the line 3–4, fig. 1;
Figure 6, a perspective view of the plate for guiding the valve; and
Figure 7, a sectional view of part of the faucet, drawn to an enlarged scale.

General Description.

The body of the faucet consists of three hollow branches A A' and B, the inlet branch A being separated from the outlet branch A' and from the branch B, which constitutes the valve-casing by a partition, $a$, in which is a circular opening, $b$.

The valve which, when depressed, bears upon this partition, consists of the hollow circular portion $c$, fitted with suitable packing, the intermediate square portion $d$, and the screw-stem $e$, adapted to a nut, $f$, forming a part of the stem $h$, which fits snugly, but so as to turn freely in, and projects through a cover, $i$, the latter being screwed or otherwise secured to the top of the valve-casing B, and the said stem $h$ being furnished with a suitable handle, $i'$.

The square portion $d$ of the valve is arranged to fit and slide in a square opening of the plate $j$, which fits snugly in a recess in the valve-casing, and which has a notch, $k$, to prevent it from being turned round in the said recess.

Between this guiding-plate and an external collar, $m$, on the nut $f$, intervenes a spiral spring, D, which serves the twofold purpose of depressing the plate and thereby maintaining it in its proper position in the casing, and of elevating the nut and maintaining it in tight contact with the packing in the under side of the cover $i$.

Repeated tests have proved that leather forms the best packing material for the bearing-surface of such parts of faucets as have to be repeatedly turned; hence the packing $n$ in the recess in the under side of the cover, consists of a leather ring for receiving the pressure of the flange $m$ of the nut $f$. It is important, however, that the leather should be protected as far as possible from the action of the water in the valve-case.

It will be observed that this end is accomplished by making the packing recess just large enough to receive the collar $m$, and making the packing so thin that when the collar is in its place, it will have penetrated a short distance into the said recess, thereby excluding the water from the packing. This will be distinctly observed on reference to the enlarged view, fig. 7, where it will also be seen that the upper face of the collar is provided with a projecting ring, which, compressing the packing, causes the latter to embrace the stem $h$.

It will be seen, on referring to fig. 1, that the thread of the nut $f$ does not extend to the upper end of the same, but that a threadless recess is there formed, this recess communicating, through perforations $p$, with the interior of the casing B, so that the water or other fluid in the latter may gain free access to the interior of the nut, and serve as a constant lubricant for the screw.

The shape and the relative position of the two branches A and A' of the faucet are somewhat peculiar, the inlet branch, A, being tubular at the outer end, but being contracted vertically, so as to assume a transverse section of an oval form as the branch approaches the tubular casing, (see fig. 4.) The object of this is to make the branch as nearly as possible of the same sectional area throughout, so that on closing the valve there may be no excess of water at any one point in the branch to freeze and burst the same.

To make the valve of a tubular form of the same internal area throughout, would involve the necessity of a higher and, consequently, clumsier casing B; hence the contraction of the stem vertically and its extension laterally as it approaches the casing.

The same vertical contraction and lateral expansion occurs in the outlet branch, A', the sectional form of the interior of which, near the casing B, is oval, but gradually becomes circular toward the outer end of the branch, a comparatively short casing, B, and consequently a light and symmetrical faucet being thus insured.

Claims.

1. The detachable plate $j$, arranged within the case so as not to turn within the latter, and so as to guide the valve and prevent it from turning, substantially as described.

2. The spiral spring D, in combination with the nut $f$, its collar $m$, packing $n$, and the detachable guide-plate $j$, as described, and serving the twofold purpose of maintaining the said plate in its place and the collar against the packing, as set forth.

3. The annular rib on the collar $m$ of the revolving valve-spindle, in combination with the recess and its packing $n$, in the cover $i$, as specified.

In testimony whereof I have signed my name to this specification in the presence of two subscribing witnesses.

WM. S. COOPER.

Witnesses:
  JOHN WHITE,
  LOUIS BOSWELL.